US008427656B2

(12) United States Patent
Hullin et al.

(10) Patent No.: US 8,427,656 B2
(45) Date of Patent: Apr. 23, 2013

(54) ROBUST THREE-DIMENSIONAL SHAPE ACQUISITION METHOD AND SYSTEM

(75) Inventors: Matthias Hullin, Saarbrucken (DE); Martin Fuchs, Saarbrucken (DE); Ivo Ihrke, Vancouver (CA); Hendrik Lensch, Blaustein (DE); Hans-Peter Seidel, St. Ingbert (DE)

(73) Assignee: Max-Planck-Gesellschaft zur Foderung der Wissenschaften E.V., Munich (DE)

( * ) Notice: Subject to any disclaimer, the term of this patent is extended or adjusted under 35 U.S.C. 154(b) by 387 days.

(21) Appl. No.: 12/419,438

(22) Filed: Apr. 7, 2009

(65) Prior Publication Data

US 2009/0273792 A1    Nov. 5, 2009

Related U.S. Application Data

(60) Provisional application No. 61/071,300, filed on Apr. 21, 2008.

(51) Int. Cl.
*G01B 11/24*    (2006.01)
*G01B 11/30*    (2006.01)

(52) U.S. Cl.
USPC .......................................... 356/602; 356/601

(58) Field of Classification Search .................. None
See application file for complete search history.

(56) References Cited

U.S. PATENT DOCUMENTS 5,289,267 A * 2/1994 Busch et al. .................. 356/394
6,011,255 A * 1/2000 Rueb et al. .................... 250/234

OTHER PUBLICATIONS

Ben-Ezra, M. et al., "What Does Motion Reveal About Transparency?" In: Proc. of 9th IEEE Conf. on Computer Vision, ICCV'03, vol. 2, p. 1025-1032, Oct. 2003.
Blais, F., "Review of 20 Years of Range Sensor Development", Journal of Electronic Imaging 13, 1, p. 231-243, Jan. 2004.
Chen et al., Polarization and Phase-Shifting for 3D Scanning of Translucent Objects, in: Proc. of CVPR '06, p. 17-22, Jun. 2006.
Clark et al., "Using Light Polarization in Laser Scanning", Image and Vision Computing 15, 1, 107-117, 1997.
Curless, B. et al., "Better Optical Triangulation through Spacetime Analysis", in: Proc. of ICCV'95, p. 987-994, 1995.
Deusch, S. et al., "Time resolved 3d passive scalar concentration-field imaging by laser induced fluorescence in moving liquids", Meas. Sci. Technol., 12, p. 188-200, 2001.
Fuchs et al., "Density Estimation for Dynamic Volumes", Computers and Graphics 31, 2, p. 205-211, Jan. 2007.
Hawkins et al., "Acquisition of Time-Varying Participating Media", in: Proc. of ACM SIGGRAPH 2005; ACM, p. 812-815; Aug. 2005.
Ihrke, I., et al., "Reconstructing the Geometry of Flowing Water", in: Proc. of ICCV'05, p. 1055-1060, Oct. 2005.
Kutulakos, K.N., et al., "A Theory of Refractive and Specular 3D Shape by Light-Path Triangulation", Int'l Journal of Computer Vision 76, 1, p. 13-29, 2008.

(Continued)

*Primary Examiner* — L. G. Lauchman
*Assistant Examiner* — Amanda Merlino
(74) *Attorney, Agent, or Firm* — Davidson Berquist Jackson & Gowdey, LLP

(57) ABSTRACT

A system (100) for scanning a three-dimensional object (150) comprises a device for illuminating a plane (110); an imaging sensor (120); and a transparent container (130) for immersing the object (150) in a participating medium (140).

16 Claims, 9 Drawing Sheets

OTHER PUBLICATIONS

Maas, H.-G., "New Developments in Multimedia Photogrammetry", in: Optical 3D Measurement Techniques III, A. Grün and H. Kahmen, Eds., Wichmann Verlag, 1995.

Morris, N. et al., "Dynamic Refraction Stereo", in: Proc. of ICCV'05, p. 1573-1580, Oct. 2005.

Murase, H. "Surface Shape Reconstruction of a Nonrigid Transparent Object Using Refraction and Motion", IEEE Transactions on Pattern Analysis and Machine Intelligence 14, 10, p. 1045-1052, Oct. 1992.

Narasimhan et al., "Structured Light in Scattering Media", Proc. of ICCV'05, p. 420-427, Oct. 2005.

Park et al., "Specularity Elimination in Range Sensing for Accurate 3D Modeling of Specular Objects", In: Proc. of 3DPVT'04, p. 707-714; "3D Modeling of Optically Challenging Objects", IEEE Trans. On visualization and Computer Graphics 14, 2, p. 246-262, Sep. 2004.

Trifonov et al. "Tomographic Reconstruction of Transparent Objects", in: Proc. of EGSR'06, 51-60, Jul. 2006.

Trucco and Fisher, "Acquisition of Consistent Range Data Using Local Calibration", in: IEEE Int'l Conf. on Robotics and Automation, p. 3410-3415, 1994.

* cited by examiner

ROBUST THREE-DIMENSIONAL SHAPE ACQUISITION METHOD AND SYSTEM

RELATED APPLICATIONS

This application is related to and claims priority under 35 U.S.C. §119(e) from U.S. Patent Application No. 61/071,300, filed Apr. 21, 2008, titled "Fluorescent immersion range scanning," the entire contents of which are incorporated herein by reference for all purposes.

FIELD OF THE INVENTION

The present invention relates to a system and methods for scanning three-dimensional objects. More particularly, it relates to 3D range scanning of objects with non-cooperative materials, such as refractive surfaces, objects made of materials exhibiting a significant specular and/or subsurface scattering component, light absorbing materials such as diffusely reflecting, dark surfaces and mixtures thereof.

TECHNOLOGICAL BACKGROUND

The acquisition of three-dimensional (3D) surfaces is a problem which occurs frequently in mechanical and optical engineering, computer vision and many other application fields. Today's most precise methods involve active illumination by means of laser beams, lines or more sophisticated projection patterns. Usually, the light reflected or scattered by the surface is captured by an off-axis camera, so that the depth information can be recovered by triangulation. The usability of most of these methods is limited by the object material, which defines the reflectance properties. An ideal surface for this class of 3D scanners scatters an incoming ray of light diffusely into all directions so that each impinging light ray results in a well-defined hit point visible from any viewing direction. However, many objects and materials exhibit a reflectance that is highly uncooperative with regard to range scanning. Complex effects such as transparency, subsurface light transport, specular reflectivity, and interreflections between surface points pose a challenge for the design of a general and robust system for shape acquisition.

PRIOR ART 3D range scanning has been investigated for several decades, the majority of approaches assuming a diffuse reflectance of the object's surface. The literature on the subject is most commonly divided into active and passive techniques. Active light techniques include laser range scanning, coded structured light systems and time-of-flight scanners. An overview of the state of the art in active light range scanners can be found in [Blais, F., "Review of 20 Years of Range Sensor Development", Journal of Electronic Imaging 13, 1, p. 231-243, 2004].

The further a surface deviates from the Lambertian reflectance assumption, the less accurate standard 3D range scanning techniques become. While coating objects with paint or removable powder is an option, clearly there are situations where this is not desirable. Several researchers have addressed the shortcomings of traditional range scanning techniques, extending the class of objects that can be successfully acquired by active light techniques. Curless, B. et al. ("Better Optical Triangulation through Spacetime Analysis", in: Proc. Of ICCV'95, p. 987-994, 1995) show that varying reflectance of the scanned surface, among other factors, results in systematic depth errors. They propose to analyze the raw laser range data in tilted space-time images of single scanlines to stabilize the detection process. Trucco and Fisher ("Acquisition of Consistent Range Data Using Local Calibration", in: IEEE International Conference on Robotics and Automation, p. 3410-3415, 1994) and Chen et al. ("Polarization and Phase-Shifting for 3D Scanning of Translucent Objects, in: Proc. of CVPR '06, p. 17-22, 2007) employ polarization-based analysis to reliably remove specular reflections and subsurface scattering effects, respectively. Clark et al. ("Using Light Polarization in Laser Scanning", Image and Vision Computing 15, 1, 107-117, 1997) investigate the use of a two-camera setup to disambiguate range measurements in the case of specular surfaces.

Most laser range scanning systems assume a single peak of laser illumination per scanline of the imaging sensor. Park et al. ("Specularity Elimination in Range Sensing for Accurate 3D Modeling of Specular Objects", In: Proceedings of 3DPVT'04, p. 707-714; "3D Modeling of Optically Challenging Objects", IEEE Trans. On visualization and Computer Graphics 14, 2, p. 246-262) show that multiple peaks frequently occur in the case of specular objects and propose methods to eliminate false measurements by applying local smoothness and global consistency constraints.

The other broad class of object acquisition techniques uses passive sensing. However, the accuracy of the acquired object geometry varies widely and is in general lower than that achievable with active light techniques.

Specialized techniques have been developed to cover different classes of uncooperative materials. Usually these materials either exhibit a significantly non-Lambertian reflectance resulting in secondary lighting effects such as interreflections or refraction.

Interest was spawned by the photogrammetry community, with the goal of accurately measuring under-water objects. The problem is posed as bundle adjustment in the presence of a single refracting surface bounding a medium, surrounding the object of interest. The refractive index is assumed to be known. The requirement of a known refractive index can be relaxed when the interface is planar (Maas, H.-G., "New Developments in Multimedia Photogrammetry", in: Optical 3D Measurement Techniques III, A. Grün and H. Kahmen, Eds., Wichmann Verlag, 1995). Reconstruction of the surface geometry is described by Murase ("Surface Shape Reconstruction of a Nonrigid Transparent Object Using Refraction and Motion", IEEE Transactions on Pattern Analysis and Machine Intelligence 14, 10, p. 1045-1052, 1992). The author analyzes a distorted pattern at the bottom of a water tank to estimate the shape of a water surface. Morris and Kutulakos ("Dynamic Refraction Stereo", in: Proc. of ICCV'05, p. 1573-15802005) use the same principle to deal with dynamic water surfaces exhibiting an unknown index of refraction. The reconstruction of single refracting surfaces is a special case of multi-interface reconstruction which has been theoretically analyzed by Kutulakos and Steger ("A Theory of Refractive and Specular 3D Shape by Light-Path Triangulation", International Journal of Computer Vision 76, 1, p. 13-29, 2008]. The method is based on ray measurements using an LCD screen mounted onto a precision translation stage.

A different technique for reconstructing refractive objects or fluids is based on inverse ray-tracing. Assuming an object's surface at a certain position, an image is generated using a forward model of light transport. The surface is then optimized such that the synthetically generated image matches the photograph as closely as possible. One example of this technique is introduced by Ihrke et al. ("Reconstructing the Geometry of Flowing Water", in: Proc. of ICCV'05, p. 1055-

1060, 2005) who reconstruct free-flowing water surfaces using measurements of the optical path length inside the water column.

Ben-Ezra, M. et al. ("What Does Motion Reveal About Transparency?" In: Proc. of ICCV'03, vol. 2, p. 1025-1032) use a model-based approach to reconstruct simple shapes such as spheres, cylinders and lens-shapes based on the apparent movement of refracted feature points. Morris and Kutulakos (op. cit.) describe an active light technique called scatter trace photography that can be used to acquire the geometry of objects with difficult material properties. The method is based on analysis of the materials' reflectance properties using a moving light source.

Acquisition of object geometry in the presence of participating media is discussed by Narasimhan et al. ("Structured Light in Scattering Media", Proc. of ICCV'05, p. 420-427, 2005). Here, the intention is to counteract the degradation in image quality induced by the scattering environment. However, rather than causing objectionable effects, scattering media can also be used as a tool for vision and measurement purposes (Deusch, S. and Dracos, T., "Time resolved 3d passive scalar concentration-field imaging by laser induced fluorescence in moving liquids", Meas. Sci. Technol., 12, p. 188-200, 2001).

In fact, sparse sets of light rays have already been used as probes for optical density measurements, e.g. in the context of smoke scanning (Hawkins et al., "Acquisition of Time-Varying Participating Media", in: Proc. of ACM SIGGRAPH 2005; ACM, p. 812-815; Fuchs et al., "Density Estimation for Dynamic Volumes", Computers and Graphics 31, 2, p. 205-211, 2007). However, media such as smoke or dilute milk exhibit multiple scattering, resulting in a visible halo around the actual ray and a significant decrease in perceived contrast. This is due to the fact that scattering events in these media are elastic, i.e. upon scattering of a photon its wavelength is conserved. Therefore, photons can be scattered any number of times before they leave the volume or are absorbed.

Finally, 3D shapes can be acquired by means of computerized tomography, e.g. using X-rays that do not underlie refraction. Trifonov et al. ("Tomographic Reconstruction of Transparent Objects", in: Proc. of EGSR'06, 51-60, 2006) transfer the CT methodology to optical wavelengths by immersing transparent objects in a liquid of matching refractive index.

It is an object of the present invention to provide a robust and accurate method and system for scanning or acquiring the shape of three-dimensional objects having refractive surfaces, or consisting of materials exhibiting a significant specular component, or light-absorbing materials such as diffusely reflecting, dark surfaces and mixtures thereof.

SUMMARY OF THE INVENTION

These and other objects are solved according to the invention by the methods and systems according to the independent claims. Advantageous embodiments are defined in the dependent claims.

According to the invention, the object may be embedded into a fluorescent liquid. By analyzing the light rays that become visible due to fluorescence rather than analyzing their reflections off the surface, the intersection points between a projected laser sheet and the object surface may be detected for a wide range of different materials. For transparent objects a slice through the object may even be directly depicted in just one image by matching its refractive index to the one of the embedding liquid. This enables a direct sampling of the object geometry without the need for computational reconstruction. This way, a high-resolution 3D volume can be assembled simply by sweeping a laser plane through the object.

The term fluorescence denotes a process where a photon is absorbed by an electronic system (atom, molecule, ion), which then emits a photon of different wavelength. The change of wavelength always occurs towards long waves (Stokes shift), as required by the conservation of energy. A set of very desirable properties result: Multiple scattering can almost completely be suppressed by using an excitation wavelength that is close to the long wavelength tail of the absorption spectrum. Due to the loss of energy, a photon that takes part in one scattering event is unlikely to be scattered again, rendering the fluorescent fluid close to transparent for the emitted wavelength.

Using an optical longpass filter, the fluorescence may conveniently be separated from surface reflections. Finally, as a side effect, the phase function is almost perfectly isotropic, since the excited state of the dye molecule typically has a lifetime in the order of a few nanoseconds, during which the molecule can rotate numerous times before it emits a photon into an uncorrelated direction.

Based on this principle of observing the attenuation along a ray in a fluorescent fluid rather than detecting the direct reflection of light from the surface, a 3D range scanning system is provided for detecting the surface of objects composed of a wide range of materials. The inventive system enables the acquisition of dark, glossy, subsurface-scattering or even fully transparent objects.

Exploring the same principle, a second setup is proposed for performing direct volume slicing for transparent objects with a constant index of refraction. After matching the refractive index of the fluid and the object, the light rays in the volume form straight lines.

In contrast to tomographic reconstruction, individual silhouette slices through the object may directly be captured as the laser sheet is only visible outside the object, in regions where it interacts with the fluorescent fluid.

BRIEF DESCRIPTION OF THE FIGURES

These and other aspects of the present invention will become more apparent when considering the following detailed description of an embodiment of the invention, in connection with the annexed drawing, in which.

DETAILED DESCRIPTION

Figure 1:
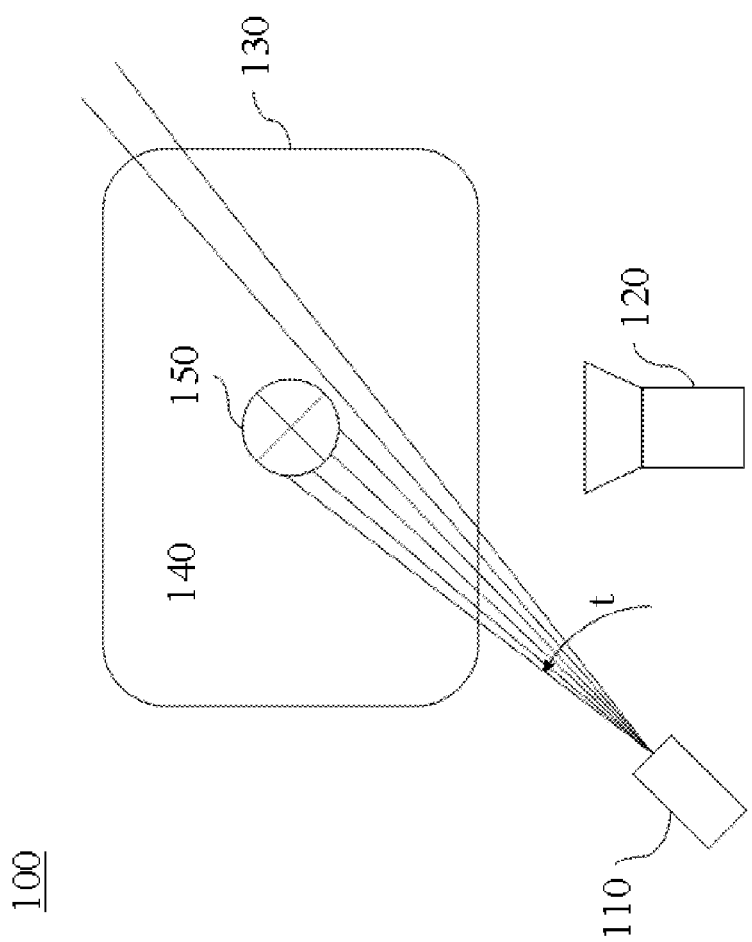
FIG. 1 shows a top view of measurement system according to an embodiment of the invention.

FIG. 1 shows a top view of a general physical measurement setup according to one embodiment of the invention.

The setup comprises a device for illuminating a plane, preferably a computer-controlled laser projector 110, an imaging sensor 120 and a container 130. The imaging sensor 120 may be a CCD or CMOS camera. The container 130 has transparent walls through which a laser beam from laser projector 110 may pass. In particular, it may be a glass tank. The container 130 is filled with a participating medium 140 in which an object to be measured or scanned, designated by numeral 150, may be immersed.

The computer-controlled laser projector 110 may comprise a frequency doubled Nd:YAG laser (P=60 mW, λ=532 nm) and a computer controlled XY pair of galvanometer scanners.

The imaging sensor 120 may be a Canon EOS 5D equipped with a 100 mm f/2.8 macro lens. In order to capture only the fluorescence and filter out any reflections of laser light, the lens may be equipped with an optical longpass filter (e.g. Thorlabs FEL0550) with a cut-off wavelength of $\lambda_c$=550 nm.

The image sensor 120 may be positioned such that an optical axis of the imaging sensor 120 is approximately aligned with a normal of the bounding plane of the transparent container 130. The laser projector 110 may also be positioned at an angle of approximately 30° to 45° to the optical axis of the imaging sensor 120. The laser projector 110 may further be positioned at an angle of approximately 90° to the optical axis of the imaging sensor 120.

The participating medium 140 renders visible the sheets of light that are projected by the laser projector 110.

The light sheet range scanning approach of the invention is based on the visualization of light rays propagating through space in front of the object surface. This visualization may be achieved by employing a participating medium that, at every point in the volume, diverts a small portion of the incident illumination towards the camera. Possible candidates are scattering media such as smoke, dilute milk or fluorescent liquids, but fluorescent liquids are particularly well suited for our task of 3D scanning.

Ideally, the participating medium excludes multiple scattering and contributions from the surface as far as possible, such that single scattering would determine the image formation. As the inventors have found out in experiments, this may be achieved to a very large extent by using a fluorescent dye either inside water or inside a refractive index matching fluid.

The intensity of emitted light depends on the concentration of the fluorescent agent. A higher concentration increases the scattering coefficient $\sigma_s$ of the solution, resulting in higher fluorescent emission intensity. On the other hand, the absorption of light along the laser ray also increases. In order to minimize CCD noise of an image sensor 120, a trade-off may be found that minimizes intensity fall-off along the illuminating rays while keeping exposure times at reasonable levels.

According to the invention, it may be obtained by using the chemical Eosin Y, which exhibits fluorescent characteristics, with different liquids.

Due to the use of a fluorescent agent, the laser sheet is visible to the camera as long as it travels through un-occluded space. As soon as the incident light interacts with the surface, most of its energy is absorbed or reflected by or transmitted through the object. Since the object itself is supposed not to be fluorescent, one may observe a significant fall-off in the measured intensity along the laser sheet exactly at the intersection point with the object's surface. The inventive surface detection will therefore concentrate on detecting a negative change in intensity rather than detecting a peak as in traditional range scanning (cf. Curless and Levoy, 1995).

This drop in intensity may be observed regardless of the surface properties, as long as the material is not perfectly mirroring.

The scanned object 150 may be fixed onto a precisely manufactured, manual turn-table positioned in the glass tank. By rotating and scanning the object 150, surface scans may be acquired from different orientations, similar to traditional range scanning approaches. The single scans have to be merged in order to produce a full mesh.

Calibration

Figure 2:
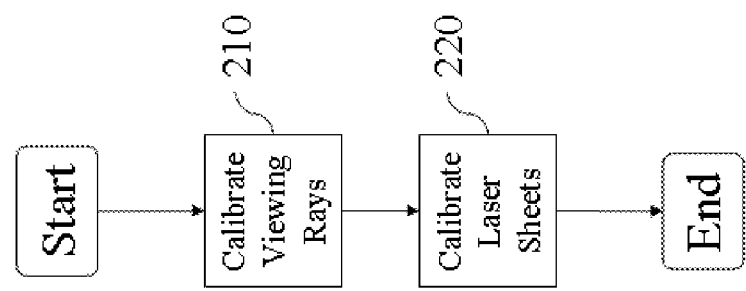
FIG. 2 shows a flowchart of a method for calibrating the measurement system described in connection with FIG. 1.

FIG. 2 shows a flowchart of a method for calibrating the range scanning system described in connection with FIG. 1. The method comprises two steps, 210 and 220.

In step 210, the viewing rays are calibrated using an image-based approach. A precisely manufactured, planar calibration target with known world coordinates is affixed to the turntable and recorded from different orientations. This step results in a vector of 3D world coordinates (x, y, z) per pixel (u, v) of the imaging sensor 120, defining mappings $$T_\alpha : \Re^2 \to \Re^3$$

from image space to world space. α denotes the orientation of the calibration target and $T_0$ and $T_{180}$ define the front and the back of our reconstruction volume, respectively. Transforming the pixel coordinates (u, v) to world coordinates using the transformations $T_\alpha$, a set of 3D points (x, y, z) may be obtained for each camera pixel. The camera rays within the glass tank may be computed by fitting a three-dimensional line, Eq. 3, to these points.

Figure 3:
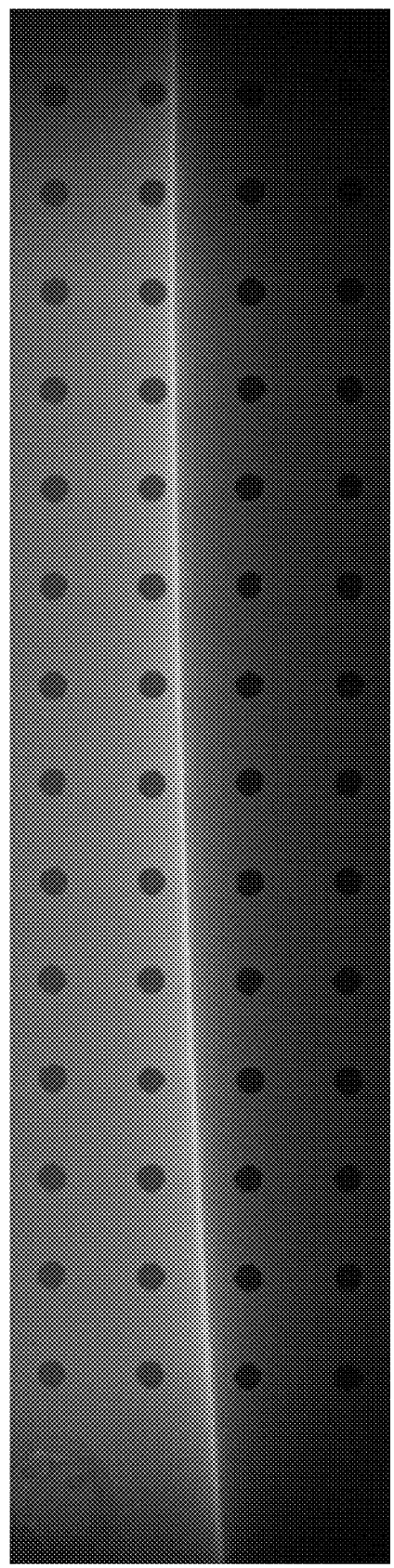
FIG. 3 shows an example of a laser sheet being projected onto the calibration target.

In step 220, a similar image-based technique can be used to calibrate the laser sheets inside the recording volume. However, since sheets of light are projected into a refractive medium, single rays within the sheet form different incident angles with the medium. This results in a deformation of the sheets, which no longer form planes in space, as shown in FIG. 3. Here, the sheet of light intersects the planar target in a curve. In the background, part of the calibration pattern is visible. The dots have a distance of 10 mm center to center.

In order to intersect camera rays with the curved light sheets and thus triangulate 3D points, an algebraic description of the curved laser illumination is required. To compute this description, a sparsely sampled set of laser sheets projected onto the planar calibration target may be recorded, again in different orientations. The intersection points of the laser sheet with the calibration target in the image plane may be computed as described in Section 5. The set of sampled intersection points may be denoted by $(u^i_\alpha, v^i_\alpha, t_\alpha)$, i=1 ... N, where N is the number of detected 2D points for laser sheet $t_\alpha$ with the calibration target rotated into position α. Then, the positions of these sample points may be computed in world coordinates by applying the appropriate mapping $T_\alpha$:

$$(x,y,z,t) = [T_\alpha(u_\alpha, v_\alpha); t_\alpha] \quad (1)$$

For better readability, the sample number i is omitted from the equation. Applying Eq. (1) one obtains a number of world points (x, y, z) that were hit by a particular laser sheet t. The sampled points may be used to interpolate this information in the whole reconstruction volume. The behavior of the light sheets inside the glass tank may be modeled as a quadratic polynomial in y and t, while keeping the dependency on x linear:

$$z = f(x,y,t) = a_0 y^2 x + a_1 y^2 + a_2 yx + a_3 y + a_4 x + a_5,$$

$$a_i = b_{i0} t^2 + b_{i1} t + b_{i2}. \quad (2)$$

Eq. (2) is linear in its 18 coefficients $b_{00}$ to $b_{52}$. Thus, one obtains one linear equation per sample point (x, y, z, t) and can solve for the polynomial's coefficients in a least squares sense. The choice to keep f linear in its argument x is motivated by the fact that in our setup the laser sheet forms a constant angle with the boundary of the glass tank for this variable. Therefore, the curvature of the laser sheet will not be affected by changes in the x coordinate.

Triangulation

The task of triangulation is to determine a 3D point from pixel positions (u, v) on the image sensor and a laser sheet t. The first step of the calibration procedure yields a ray for each image pixel:

$$r(u,v)=p(u,v)+sd(u,v). \quad (3)$$

Rearranging Eq. (2) into an implicit form $$f(x,y,t)-z=0, \quad (4)$$

and combining it with Eq. (3) we obtain a cubic polynomial in s. Solving it results in three solutions, which we insert into the ray equation, Eq. (3). The resulting points may be checked against the reconstruction volume and the ones that fall outside of it may be discarded.

Figure 4:
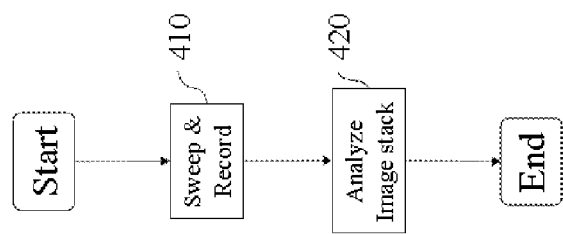
FIG. 4 shows a flowchart of a method for acquiring surface data according to an embodiment of the invention.

FIG. 4 shows a flowchart illustrating the basic process of surface data acquisition according to the invention, using the system described in connection with FIG. 1.

The scanning process involves the sweeping of a vertical laser sheet through the acquisition volume. The scanning process is started in step 410 with the laser sheet t=0 closest to the camera and proceed towards the back of the glass tank, i.e. with increasing angle t the distance between the laser sheet and the camera increases as well. For each projected laser sheet, an image is taken with the imaging sensor. The output of this step is a stack of images $I_t(u, v)$.

In step 420, those images are analyzed to determine the intersection points between the object and the laser sheet:

In the following, a robust surface detection algorithm and a volume slicing method for refractive objects will be described.

Figure 5:
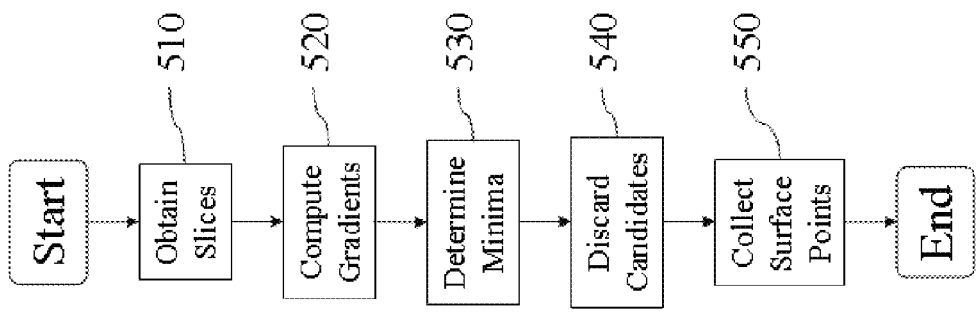
FIG. 5 shows a flowchart a method for performing a surface range scan according to one embodiment of the invention.

FIG. 5 shows a flowchart of a method for performing a surface range scan according to one embodiment of the invention. The method may operate on surfaces that are otherwise challenging for traditional 3D scanners, namely transparent, translucent or dark materials.

According to the present embodiment of the invention, a measurement setup suitable for fluorescent immersion surface scanning may employ plain water as a basis for the participating medium. The concentration of Eosin Y may approximately be 0.5 mg·l$^{-1}$. The image sensor 120 may be positioned such that its optical axis is approximately aligned with the normal of the bounding plane of the glass tank. This way, image aberrations may be minimized and a relatively homogenous sampling rate may be achieved in the image plane. In the present embodiment, the laser is positioned at an angle of approximately 30°-45° to the camera's optical axis. As in traditional laser scanning, there is a trade-off between triangulation accuracy and occlusion problems. Additionally, grazing angles of the laser plane with respect to the front face of the glass tank may be avoided It is assumed that data acquisition step 410 of FIG. 4 has already taken place. In order to detect the surface, the captured images $I_t(u, v)$ are analyzed in a space-time stack, and initially processed in step 510 per camera scanline. For each scanline v, a slice $S_v(u, t)$ through the space-time volume may be obtained.

In step 520, the gradient g with components $(g_u, g_v, g_t)$ of the recorded intensity of a pixel in the space time volume is computed on a median filtered space-time volume. The size of the kernel may be taken to be 3×3×3.

In step 530, all local minima of $g_t$ that are below a threshold $\theta_t$ are determined with sub-pixel precision, reporting a fractional t value for each camera pixel. Blurring the gradient images before the thresholding allows to trade resolution against smoother results.

In step 540, all candidate points are discarded
1. whose gradient component $g_u$ has a negative peak (indicating an intensity drop); or
2. whose 2D gradient $(g_u, g_v)$ is perpendicular to the laser direction l in the image (indicating that the feature is aligned with laser rays);

with the corresponding thresholds $g_u \leq \theta_u$ and $\angle(\vec{l},(g_u, g_v)) \leq \theta_\alpha$. In order to close some occasional gaps, this selection process may be softened by also keeping points which have an 8-neighbor that meets the criteria.

In step 550, the slice is traversed from bottom to top, and all first surface points encountered are collected. The surface is required to be monotonic, which is necessary for transparent objects. Otherwise it might happen that distorted features behind the first surface are detected as well. For nontransparent materials, however, the monotonicity constraint may be dropped, resulting in a higher yield of valid surface points.

After performing this routine for each space-time slice, a map is obtained containing at value per camera pixel (FIG. 12). It might still contain a number of patches that correspond to volume caustics due to reflection or refraction. Since those unwanted surfaces are typically small in size, most can be eliminated by segmenting the depth map estimate into continuous patches and discarding or filling up segments that contain less than $n_{min}$ pixels.

The absolute threshold, denoising and segment size filter parameters have to be found to meet demands of the respective measurement setup (camera resolution, measurement geometry, light sheet brightness, etc.). After downscaling all camera images by 50% (corresponding to approx. 3 megapixels), the following parameters performed well for the above-described setup: $\theta_\alpha=85°$, $n_{min}=1000$. The optimal choice of the thresholds $q_t$ and $q_u$ depends on the observed contrast in the space-time images and may be determined experimentally for a given setup.

The filtered depth map t(u, v) may be converted into a 3D surface mesh using the camera calibration as described above.

Matching the Refractive Index

So far, scanning was limited to the first surface, where the light is being refracted and no longer propagates in a straight line.

According to another embodiment of the invention, a measurement setup suitable for fluorescent immersion volume scanning for refractive objects with constant index of refraction, the refractive index of the immersing liquid may be matched to that of the object before scanning it. This measure straightens the ray paths and allows direct observation of volumetric slices of the object.

Refractive index matching liquids are available for a wide range of indices. However, they tend to get more and more poisonous as the refractive index increases. Trifonov et al. [2006] suggest the use of potassium thiocyanate to obtain a refractive index of around 1.5, which is sufficient for most light glasses. From a saturated solution (around 80%) the refractive indices of borosilicate glass (n=1.48) and quartz glass (n=1.46) can easily be matched by gradually adding water until the refractive index of liquid and glass is approximately equal.

However, the refractive index can only be matched perfectly for the single wavelength of the laser. Because of the broadband spectrum of the fluorescence light, dispersion may cause a slight disturbance of light rays on their way from the illuminated plane to the camera through glass structures.

A drawback of potassium thiocyanate is that it weakens the fluorescence of Eosin significantly. Alternatively, glycerol may be considered, which, unlike potassium thiocyanate, is non-ionic and therefore induces less chemical stress on the dye molecules, may yield a higher efficiency (more emission per absorption). However, due to the high viscosity of glycerol, heavy stirring is necessary to blend it with water, which in turn produces numerous small bubbles.

In addition to matching the refractive index of the immersing liquid to the object, the laser-camera setup may be changed to an approximate 90° setup. The laser 110 projects sheets of light through one side of the glass tank, while the imaging sensor 120 observes the object slices through the other. This is possible because occlusion is not going to occur for transparent objects immersed in a refractive index matched liquid. The objects are close to invisible to the naked eye due to negligible refraction.

By matching the refractive index of the liquid to that of the object the ray direction is preserved even at interfaces between liquid and solid, so that all intersections between a light ray and the object occur along a straight line (cf. Trifonov et al. [2006]).

Using a fluorescent liquid, one may now observe entire slices of clear objects at once when illuminating the tank with a laser sheet. Since the index of refraction is matched, the viewing rays will not bend at the surface. The object overall, and in particular in front or behind the laser plane, therefore is not visible at all. Since the object itself is not fluorescent, only the surrounding liquid lights up while the object remains black. The object's surface is located at the boundary between light and dark image regions. In order to capture the entire volume we sweep the laser plane through the entire volume once.

Figure 6:
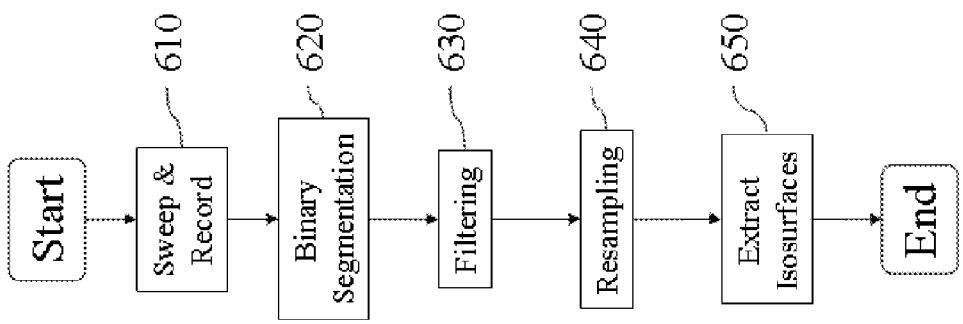
FIG. 6 shows a flowchart a method for capturing transparent objects volumetrically according to another embodiment of the invention.

FIG. 6 shows a flowchart of a method for capturing transparent objects volumetrically using the modified setup. The method operates without the need for tomographic reconstruction. The method directly records one slice through the volume for every laser sheet.

In step 610, a light plane is swept through the volume in order to record one slice for every laser sheet, resulting in a space-time stack.

In step 620, a binary segmentation is performed in order to separate the object from the background. A stable separation may obtained by using a simple thresholding at 50% of a median filtered reference image in which the laser sheet does not hit the object.

The segmented slices might still contain a set of misclassified pixels.

In step 630, they are therefore filtered in spatial and space-time domain to reduce noise and artifacts.

Figure 8:
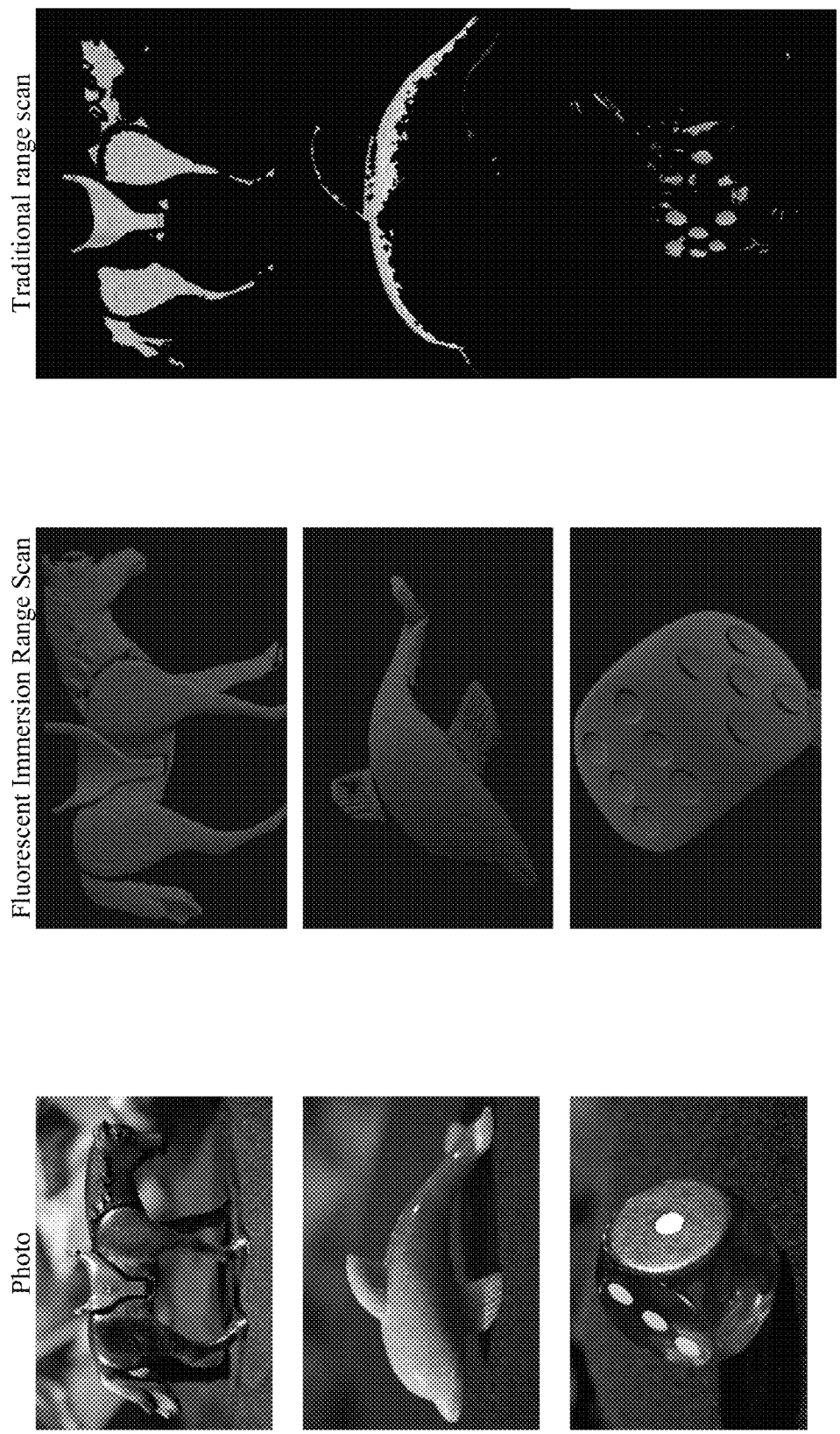
FIG. 8 shows sample range scans acquired by the methods described in connection with FIGS. 4 and 5 for a set of surfaces that are difficult to acquire with traditional methods.

More particularly, particles in the liquid, bubbles, and other effects lead to the presence of a "salt and pepper"-type noise which forms connected regions in the order of a few pixels. They may be removed by inverting all connected regions that are smaller than, e.g. 200 pixels Moreover, inclusions in the glass, such as bubbles of air or particles, or regions with different refraction index may cast (needle-shaped) shadows. Similarly, a slight mismatch in the refractive index can cause such shadows (as depicted in FIG. 8).

Two different approaches may be used to detect and to remove these kinds of artifacts.

Most of these artifacts extend to the far right side of each volume slice. Any feature that is detected in the region outside the object's bounding box may be treated as a shadow region. All of these regions may be projected onto a shadow map. Then, each shadow region may be traced back towards the laser, until its entire cross-section is lit. All pixels on this trace are marked as invalid.

After marking all possible shadow pixels they may be filled using a simple volumetric diffusion in the space-time stack of images, i.e. even across different laser sheets.

Some small horizontal lines that do not extend to the outside may be missed by this approach. Here, simply all horizontal features that are less than five pixels in height may be removed which is very small compared to any part of the real object.

In step 640, the filtered stack is resampled into world coordinates (x, y, z)

In step 650, the isosurfaces may be extracted using the Marching Cubes method of Lorensen and Cline ("Marching Cubes: A high resolution 3D surface construction algorithm", in: Proc. of ACM SIGGRAPH 1987, 163-169, 1987).

Figure 7:
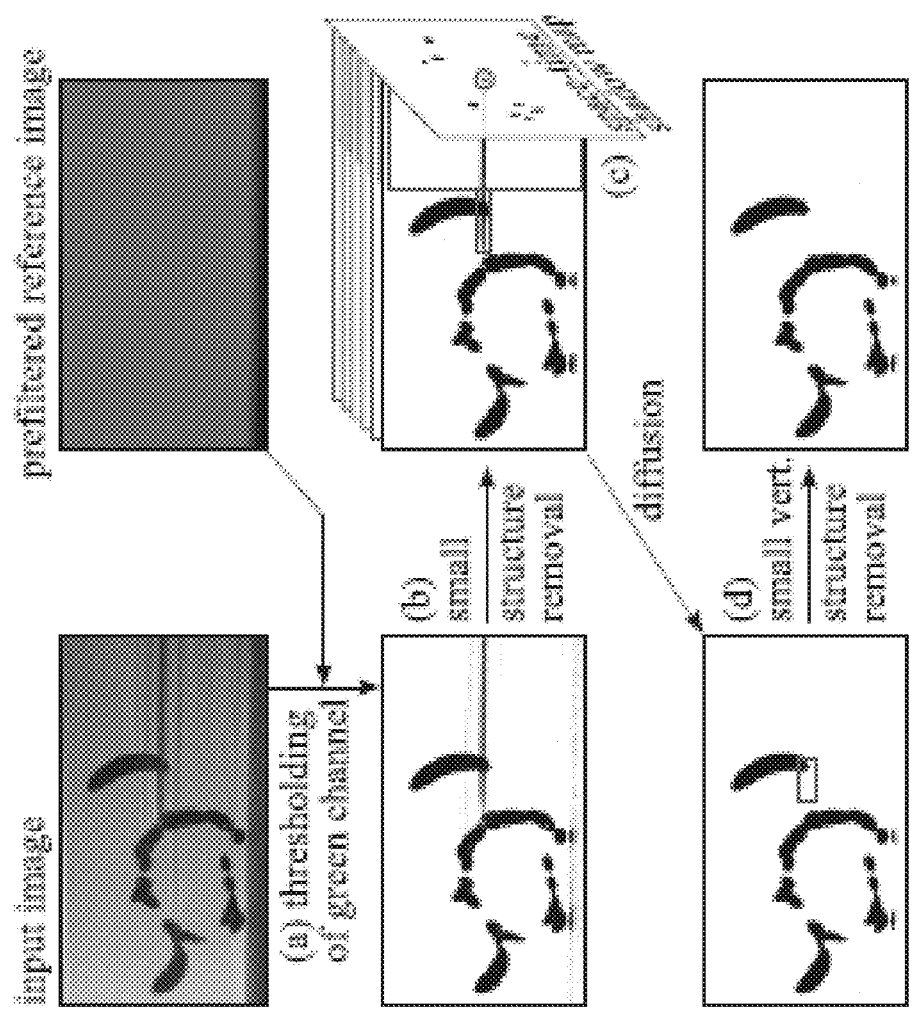
FIG. 7 shows a pipeline or method for filtering out misclassified pixels.

FIG. 7 shows a pipeline or method for filtering out misclassified pixels. A binary segmentation is performed using a simple thresholding at 50% of a median filtered reference light sheet (a). As a first denoising step, all four-connected image regions smaller than 200 pixels are discarded (b). Shadows cast by inclusions are detected as they penetrate the space to the right of the object (green box) which should be un-occluded (c). After tracing them back towards the light source, the traversed space-time volume segments are filled by 3D diffusion. Remaining horizontal features of insignificant height are removed in the last filtering step (d).

The following effects are accounted for:
Noise. Particles in the liquid, bubbles, and other effects lead to the presence of a "salt and pepper"-type noise which forms connected regions in the order of a few pixels. They can be easily removed by inverting all regions that are smaller than 200 pixels (FIG. 7(*b*)).
Needle-shaped shadows. Inclusions in the glass, such as bubbles of air or particles, or regions with different refraction index will cast shadows. Similarly, a slight mismatch in the refractive index can cause such shadows. The invention proposes two different approaches to detect and to remove these kinds of artifacts.

Most of these artifacts extend to the far right side of each volume slice. Any feature that is detected in the region outside the object's bounding box may be treated as a shadow region. All of these regions may be projected onto a shadow map. Then, each shadow region may be traced back towards the laser, until its entire cross-section is lit. All pixels on this trace are marked as invalid.

After marking all possible shadow pixels they are filled using a simple volumetric diffusion in the space-time stack of images, i.e. even across different laser sheets. The process is illustrated in FIG. 7(*c*) and (*d*).

Some small horizontal lines that do not extend to the outside are missed by this approach. One may simply remove all horizontal features that are less than five pixels in height which is very small compared to any part of the real object (see FIG. 7(*d*)).

The filtering so far was performed on a space-time stack of images, which, as the final step, is resampled into world coordinates using the calibration data.

Results

To demonstrate the versatility of the inventive approach, the surface shape of several challenging objects has been acquired.

FIG. 8 illustrates the performance of our prototype fluorescent immersion range scanner compared to traditional scans acquired with a commercial laser range scanner (Minolta Vi910). The figure shows a scan from a single direction for both acquisition systems. The data produced by the inventive system is essentially unfiltered, except for the simple image processing operations explained above.

The horse model (top row) consists of two different materials. The first material is a black, rough plastic, while the second one has photo fluorescent immersion traditional range scan range scan a higher albedo and is smooth. Both materials are glossy, showing significant surface highlights. The Minolta scanner captures the higher albedo material quite well but has problems with the dark material. In comparison, our approach captures the details of the surface very well and even captures the surface roughness of the dark plastic. The dolphin (middle row) consists of a translucent stone and is an example for a sub-surface scattering material with some crystal structure beneath the surface. Again, the commercial scanner fails to provide a dense depth map, whereas the inventive result reveals significant detail. In this example, however, one may observe small holes in the fins of the dolphin which cannot be attributed to occlusion alone. The reason is an overly aggressive thresholding during the construction of the depth map where pixels with a low gradient component gu are removed. The lines on the fins are thus classified as stationary features. The third example (bottom row) is a transparent die with diffuse, white dots. Actually, the object's transparent part is fluorescent as well, but the material's extinction coefficient happens to be high enough that all fluorescent emission is limited to the surface. The Minolta scanner can only capture the diffuse, white part of the surface, while our method produces a dense depth map for both material types. However, due to the fluorescence of the material, a conventional laser scanner equipped with a green laser would probably be able to capture the full surface of this object.

The volume slicing technique according to the invention is geared towards capturing transparent objects. We demonstrate its effectiveness on two objects. The first is a bowl of quartz glass (n=1.46) with a set of quartz glass cylinders of 10 mm diameter. Our other glass object is a mouse figurine, made from borosilicate glass (n=1.48).

Figure 9:
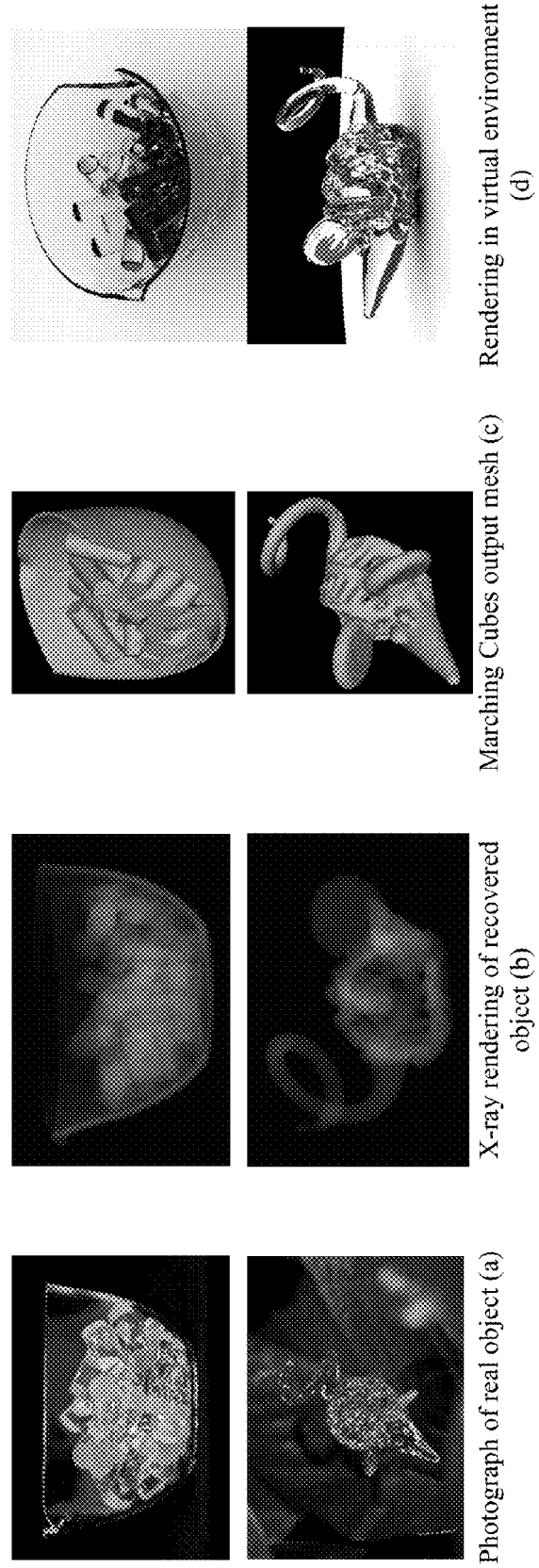
FIG. 9 shows sample volumes acquired by a method and system according to the invention.

FIG. 9 shows the results of the two volume scans. Both objects were scanned with a potassium thiocyanate solution as refractive index matching liquid.

The bowl is a challenging object because of the numerous overlapping, lens-like cylinders that focus the light, requiring very precise refractive index matching. The size of the acquired volume model is 1100×720×1400 voxels, the real world size of the object being 92 mm. This results in a voxel resolution of about 0.08 mm in each dimension. However, the overall resolution achieved in practice is a little lower. As can be seen in FIG. 9(c), in the back of the volume (from the camera's viewpoint) some artifacts appear. They result from the differing wavelength of the laser illumination and the light emitted by Eosin Y. As discussed above, the refractive index matching is only accurate for one particular wavelength. One also has to match the refractive indices for the wavelength of the illuminating laser light to ensure planar light sheets while scanning the volume, and to suppress edge shadows. This, however, results in a slight mismatch of the refractive index for the light emitted via fluorescence, giving rise to minor artifacts in the back of the scanned volume. The gap that is visible in the bowl in FIG. 9(d) is caused by the fact that this part of the bowl was outside the calibrated volume. It was missed because the bowl is not visible in the refractive index matched liquid without the illumination of the laser sheet.

The second object, a hand-made mouse, has intricate detail and a complicated surface topology. Its length is approximately 40 mm and the acquired volume has a size of 500×300×500 voxels, resulting in a similar effective resolution as in the previous example.

The filtered volumes can be visualized with traditional volume rendering techniques producing the x-ray images in FIG. 9(b). After downsampling the data by a factor of 0.5 in all dimensions, the isosurface is extracted to generate surface models (c) which is rendered using a glass shader in a synthetic environment in (d). For quantitative analysis, two of the glass cylinders were extracted, one close to the camera and the other further away, and fitted analytical models against them. Given 11500 samples on each cylinder, an RMS error of 0.037 mm for the near and 0.285 mm for the far cylinder were obtained.

Applicability

For most objects composed of plastic, glass, ceramics, stone, or metals the immersion in a liquid is uncritical. Care has to be taken with porous materials and substances that are soluble in water or prone to corrosion. On the other hand, the same holds for covering the surface with diffuse spray paint which is often alcohol-based and, as a side effect, modifies the surface geometry.

Depending on the requirements of the object, the solvent for the Eosin molecules can be chosen from a wide range of fluids with different chemical properties, e.g. (de-aerated) water, ethanol, glycerol, other alcohols or non-polar oils, some of which are used by archaeologists to preserve organic objects.

Conclusion

Fluorescent immersion 3D scanning offers novel means for capturing the geometry of objects that due to their material are difficult to capture with traditional 3D range scanning techniques. Examples of such surfaces are dark, translucent or even transparent surfaces.

The key idea of both the proposed surface and volume scan techniques is to place the object into a tank filled with a fluorescent fluid. Rather than detecting peak intensities as in structured light scanning, the object's surface will appear as a drop of intensity. This detection method is quite robust to the surface reflection properties of the object and produces high quality surfaces and volumes with rather simple acquisition effort.

Using the fluorescent fluid, light rays can be made visible without the disturbing effects of multiple scattering. Visualizing light rays this way might inspire other novel acquisition methods, for example for visualizing and capturing reflection properties of materials.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A method for determining a location of a surface point of a structure or body, comprising the steps of:
   placing the structure/body in a fluorescent participating medium;

projecting a laser beam through the participating medium onto the structure/body;

taking an image of a trace of the laser beam in the participating medium using an imaging sensor; and determining the location of the surface point, based on a drop of intensity in the trace of the laser beam.

2. The method according to claim 1, wherein the participating medium avoids multiple scattering.

3. The method according to claim 2, wherein the body is transparent.

4. The method according to claim 2, wherein the refractive index of the participating medium is matched to the refractive index of the body.

5. The method according to claim 2, wherein the material of the body is dark.

6. The method according to claim 2, wherein the material of the body is translucent.

7. The method according to claim 1, wherein the drop of intensity is used for triangulating the location of the surface point, based on the image taken by the imaging sensor and the laser beam.

8. The method of claim 1 wherein the participating medium is contained in a transparent container, the method further comprising:

positioning the imaging sensor such that an optical axis of the imaging sensor is approximately aligned with a normal of a bounding plane of the transparent container.

9. The method of claim 1 wherein the laser beam is generated by a laser projector, and wherein the imaging sensor has an optical axis, and wherein the laser projector is positioned at an angle of approximately 30° to 45° to the optical axis of the imaging sensor.

10. The method of claim 1 wherein the laser beam is generated by a laser projector, and wherein the imaging sensor has an optical axis, and wherein the laser projector is positioned at an angle of approximately 90° to the optical axis of the imaging sensor.

11. The method of claim 1 wherein the participating medium comprises Eosin Y.

12. The method of claim 10 wherein a concentration of Eosin Y is approximately 0.5 mg/l.

13. The method of claim 1 further comprising:

providing a system comprising: (i) the imaging sensor; (ii) a transparent container for immersing the structure/body in the participating medium; and (iii) a laser projector for producing the laser beam.

14. The method of claim 13 further comprising:

calibrating the system by:

(a) calibrating viewing rays projected by the laser projector; and (b) calibrating laser sheets projected by the laser projector inside the participating medium, characterized in that the step of calibrating the laser sheets comprises correcting a deformation of the laser sheets due to refraction of laser rays by the participating medium.

15. A method for determining a location of a surface point of an object, the method comprising:

(a) providing a transparent container containing a fluorescent participating medium;

(b) placing the object in the fluorescent participating medium;

(c) using a laser projector, projecting a laser beam through the participating medium onto the object;

(d) using an imaging sensor, taking an image of a trace of the laser beam in the participating medium, wherein the imaging sensor is positioned such that an optical axis of the imaging sensor is approximately aligned with a normal of a bounding plane of the transparent container; and (e) determining the location of the surface point, based on a drop of intensity in the trace of the laser beam, wherein the drop of intensity is used for triangulating the location of the surface point, based on the image taken by the imaging sensor and the laser beam.

16. The method according to claim 15, wherein a refractive index of the participating medium is matched to a refractive index of the body.

* * * * *